Patented Aug. 25, 1953

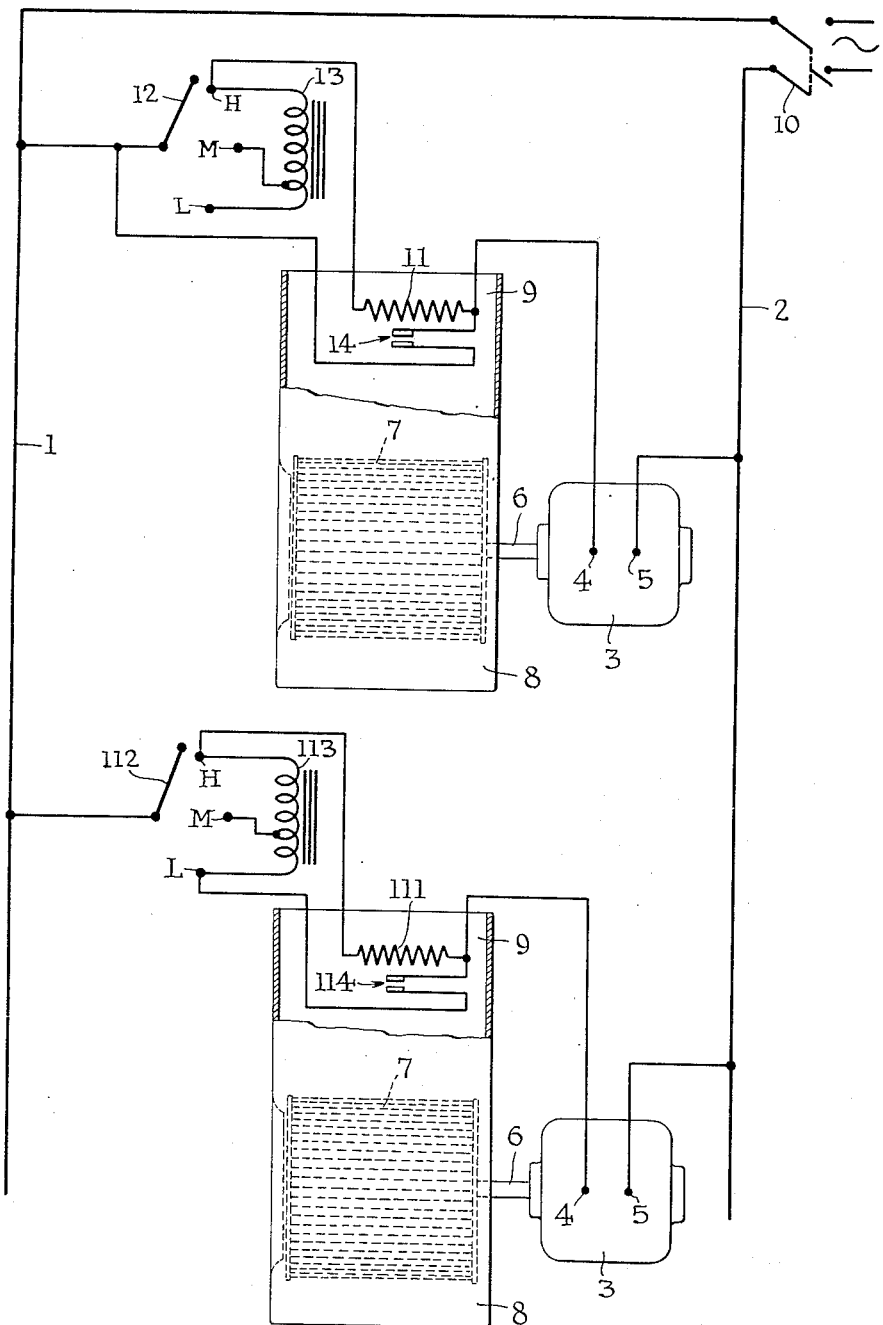

2,650,337

UNITED STATES PATENT OFFICE 2,650,337

STARTING CIRCUIT FOR LOW TORQUE VARIABLE-SPEED MOTORS

Francis M. Raver, York, Pa., assignor to York Corporation, York, Pa., a corporation of Delaware Application May 11, 1951, Serial No. 225,796

3 Claims. (Cl. 318—305)

This invention relates to fan motor controls of the variable speed type and is applicable wherever a fan is driven by a motor having a local speed controlling switch, and must be capable of starting reliably in any speed setting.

The value of the concept can be best understood if a typical installation is described. Hence, solely as a basis of explanation, the invention will be described as applied to a ventilating system comprising an electrical distribution circuit to which are connected a plurality of fan-driving motors, one or more for each room served by the system. Each motor has a speed control switch arranged to give a plurality of fan speeds, say three.

Such a system requires a large number of motors so that economic considerations demand the use of inexpensive motors. Simple fractional horsepower motors, such for example as shaded pole motors have low starting torques and this is particularly true when operated at reduced voltages produced by the use of a choke coil, which is a familiar expedient for speed control. In the low speed setting the starting torque may be so feeble that failure to start is probable, and at the intermediate speed setting starting is seriously uncertain.

Of course any such motor could be started by manually putting the control switch in high speed setting, but there may be no one in the room to do this, or the room occupant may be unaware that the motor has stalled.

Assume a system with all motors running, some at each of the three assumed possible speeds, and that current from the power lines fails or is cut off (as it might be at night). When the current is again turned on, only those motors which are set for full speed operation can be counted on to start.

The invention supplies simple automatic means to afford a temporary high speed setting, which if its motor fails to start, first supplants and then restores the local speed reducing control. In its simplest form the device comprises a normally-open thermostatic switch which closes when heated, a low output heater energized from the motor circuit and arranged to heat the switch and some means to pass a portion of the air circulated by the fan in dominant cooling relation with said switch. When the current is turned on the switch closes in response to the heating effect of the heater and shunts out the speed limiting choke coil. It then opens as the motor comes to speed and circulates enough air to cool the switch and keep it cool, whereupon motors set for intermediate or slow speed will slow to the speed corresponding to the setting.

On motors which start the thermostatic switch may not reach closed position.

If the motor includes a fan or the equivalent for circulating cooling air through the motor a part of this air could be used to cool the thermostatic switch. No implication that the fan is necessarily distinct from the motor is intended, though the commercial development here illustrated, has used such an arrangement.

The essential elements of the invention will now be described by reference to the accompanying drawing in which the single figure is a diagram of a system including a plurality of fan units (two being illustrated), the units being drawn part in section with the wiring in diagram. Two of several possible variants are shown.

The power lines are shown at 1 and 2 and are controlled by a master switch 10.

Refer first to both units. Electric motors 3 having terminal connections 4 and 5 are connected between lines 1 and 2. Each motor has a shaft 6 on which its fan runner 7 is fixed. The runner turns in the corresponding fan housing 8 which has a discharge 9.

Refer to the upper unit. Line 1 is connected to contactor arm 12 of the variable speed switch. This can be shifted to engage selectively the high, medium and low speed contacts H, M and L, but is shown in its off position. A choke coil 13 of known construction is connected at its ends to contacts H and L and at an appropriate intermediate point to contact M. Contact H is connected through resistance heater 11 with terminal 4 of its motor whose terminal 5 is connected with line 2. A thermostatic switch 14 heated by heater 11 controls a shunt from line 1 to terminal 4 and closes when temperature rises a chosen amount above atmospheric.

Refer to the lower unit. Here parts 111 to 114 correspond to parts 11 to 14 of the upper unit. The shunt controlled by switch 114 leads, however, from contact L to terminal 4.

In commercial thermostatic switches the heater 11 is commonly a resistance strip wound around a bi-metallic thermostatic bar 14, and such switches have been used successfully.

If arm 12 engages H when lines 1, 2 are energized its motor 3 will start at its full speed. Thermostatic switch 14 may not get warm enough to close, but should it do so, it would simply shunt out the heater 11.

If arm 12 engages M when the lines are energized, thermostatic contactor 14 will probably close, shunting out choke coil 13 until the motor 3 has reached a speed at which thermostatic contactor 14 is cooled by fan-circulated air sufficiently to reopen. The motor will then slow to medium speed, having started at full speed.

If arm 12 engages L when the lines are energized, the action is similar to that just described as to contact M. The motor starts at full speed and then slows to low speed.

With a 1/12 H. P. shaded pole motor supplied with 115 volt 60 cycle current, the following results are typical:

| Switch | Voltage at Motor | Current—Running | Current—Locked Rotor |
|---|---|---|---|
|  |  | Amp. | Amp. |
| High | 115 | 3.05 | 4.95 |
| Medium | 77.5 | 2.45 | 2.70 |
| Low | 66 | 2.05 | 2.10 |

The heater element 11 is sized to withstand locked rotor currents, without overheating or burning out.

The scheme is simple and has proved to be highly satisfactory for use in ventilating, heating, cooling and air conditioning, wherever adjustable speed fans are needed. Other applications are possible.

The patentably significant aspect of the invention is the location of the thermostatic switch in an air stream whose existence depends on operation of the motor, and the coordination of the heating effect of the heater and the cooling effect of the air stream in such a way that the heating effect predominates to the extent of causing shifting of the thermostatic switch when, and preferably only when, current is on and the motor does not operate.

The lower unit in the drawing operates in substantially the same way. The shunt controlled by switch 114 is not completely around choke coil 113 in medium speed setting as it is in the upper unit, but the operative difference is negligible. This arrangement is illustrated to demonstrate the flexibility of the scheme.

Many other schemes embodying the inventive concept can readily be evolved.

What is claimed is:

1. The combination of an electric circuit including a motor, a speed controller for the motor, and heating means; a shunt circuit by-passing current around at least a portion of said speed controller; a thermostatic switch in the shunt circuit, the thermostat of said switch being in heat exchange relation with the heating means, said switch establishing said shunt circuit only when heated; a fan driven by said motor and means to direct air delivered by the fan against the heating means thereby suppressing its heating effect.

2. The combination of an electric circuit; a motor and a speed controller for the motor connected in said circuit, the controller being manually adjustable to at least two positions in at least one of which it causes the motor to run at reduced speed; a thermostatic switch controlling a shunt around said controller said switch closing in response to a rise of temperature; means connected to be energized when current is supplied to the motor to heat the thermostat of said switch; and fan means rendered effective by operation of the motor to cool the thermostat of said switch.

3. The combination of an electric circuit including a motor, a speed controller for said motor and heating means connected in series, said speed controller comprising a choke coil and a manually adjustable switch element which may be set in different positions to interrupt the circuit and alternatively to establish selectively three different speed settings by including in said circuit all of the coil, part of the coil or excluding the coil; a shunt circuit around said controller; a thermostatic switch in this circuit and effective to interrupt it only when heated, the thermostat of said switch being in heat exchange relation with said heating means; a fan driven by said motor; and means to direct air delivered by the fan into heat exchange relation with the heating means thereby suppressing its heating effect.

FRANCIS M. RAVER.

No references cited.